Patented Apr. 27, 1926.

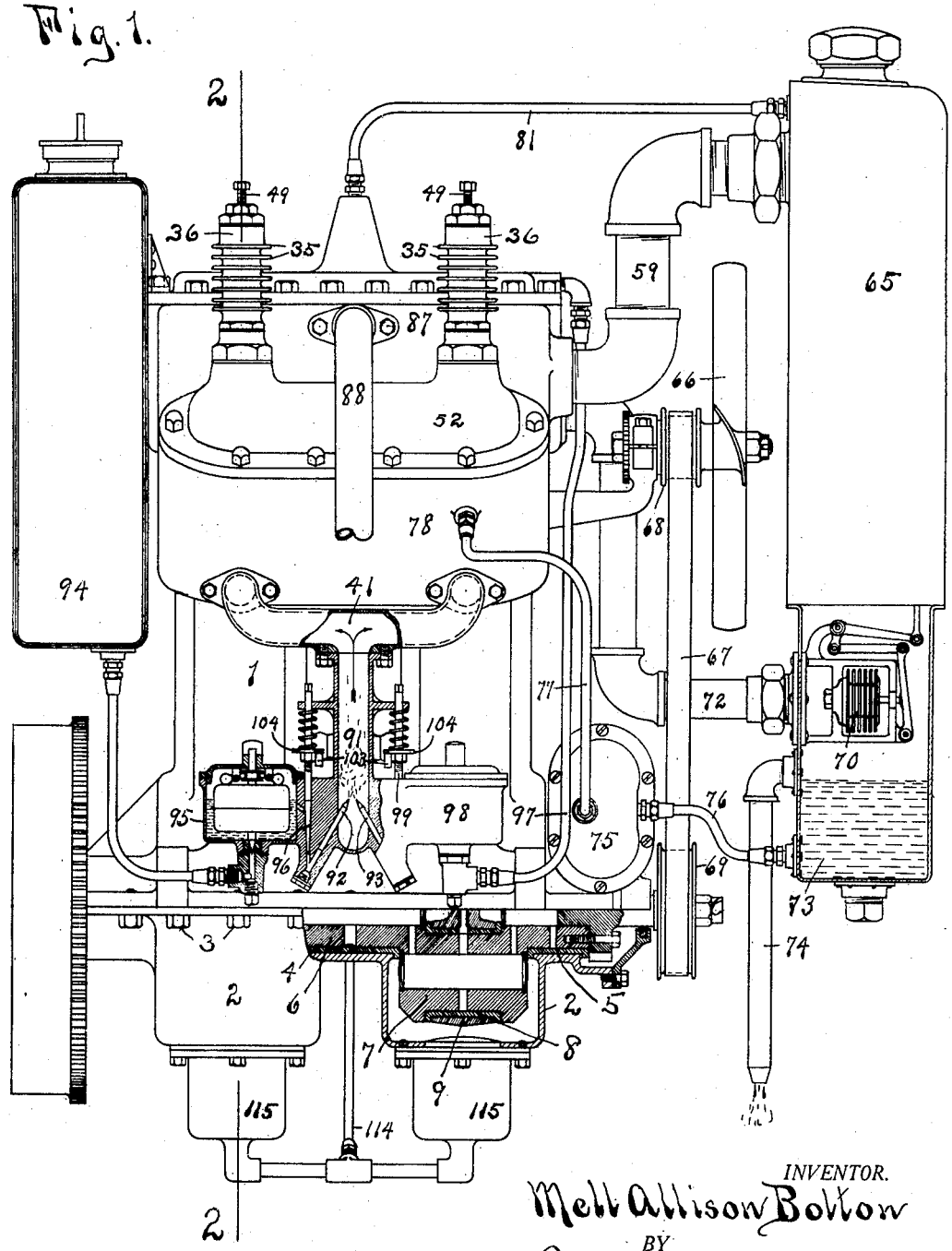

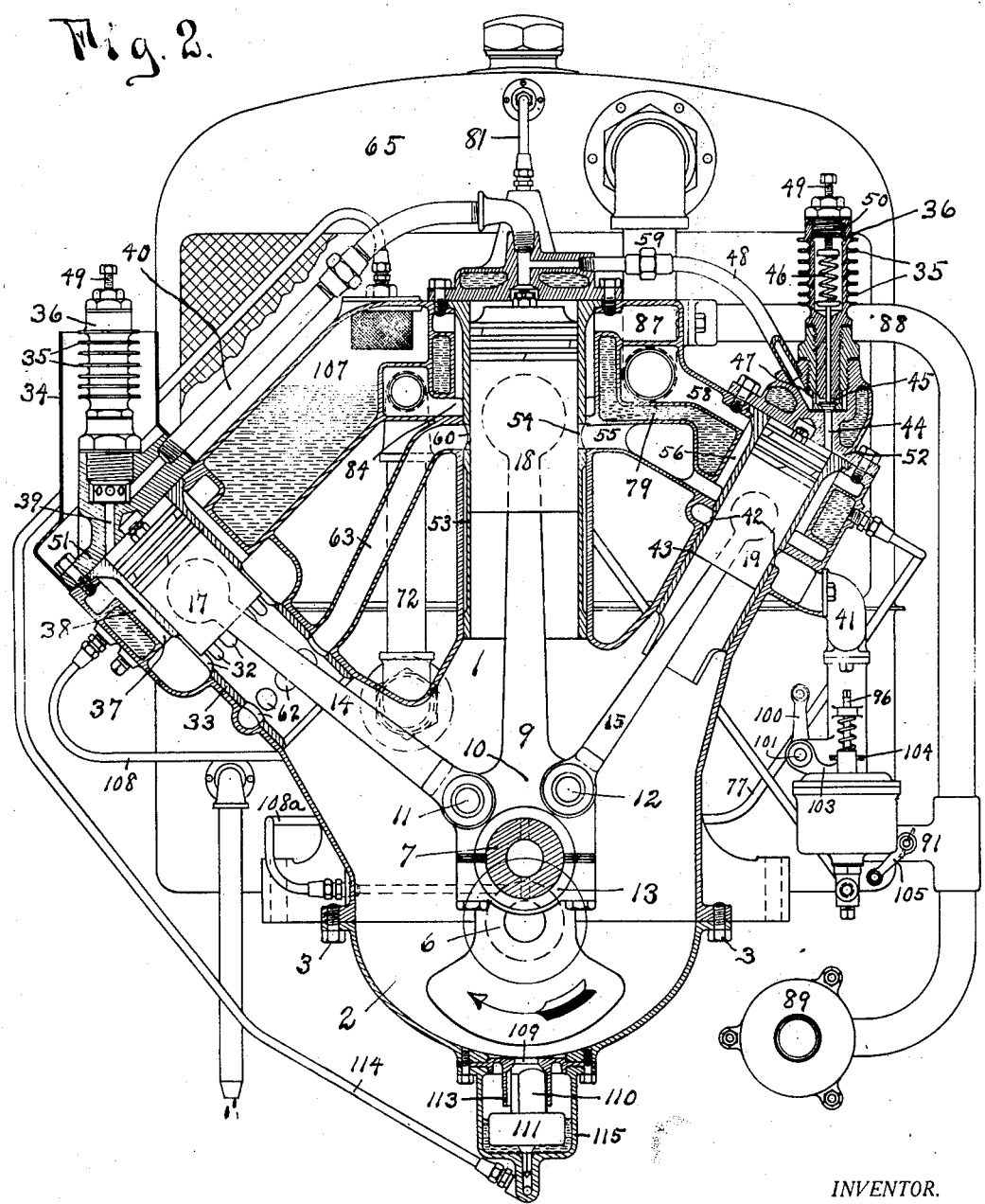

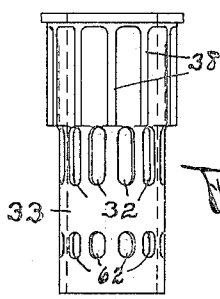
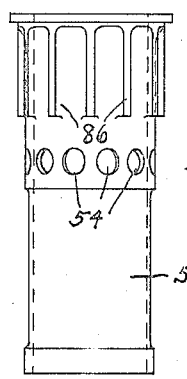
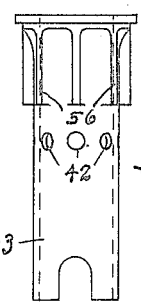
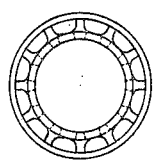
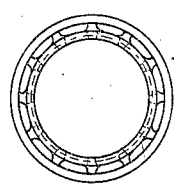
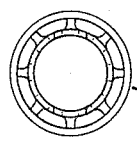
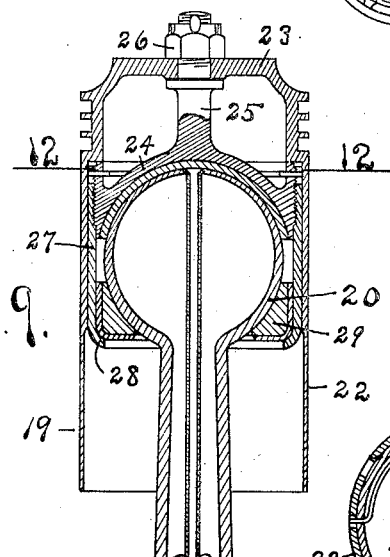
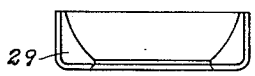
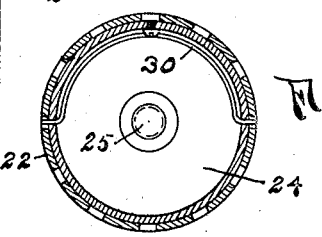

1,582,241

UNITED STATES PATENT OFFICE.

MELL ALLISON BOLTON, OF DETROIT, MICHIGAN.

INTERNAL-COMBUSTION ENGINE.

Application filed June 10, 1918. Serial No. 239,188.

*To all whom it may concern:*

Be it known that I, MELL ALLISON BOLTON, a citizen of the Dominion of Canada, and residing at Detroit, in the county of Wayne and State of Michigan, have invented a new and Improved Internal-Combustion Engine, of which the following is a specification.

My invention relates to that type of internal combustion engine wherein the explosive charge becomes ignited by reason of the high pressure applied thereto within the working cylinder, and its object is to provide an engine of this character in which the air and fuel portions of the charge will be pre-compressed by separate pumps and wherein the fuel is vaporized by a blast of inert gas.

This invention consists, in combination with a working cylinder of the two-cycle type, of separate air and fuel compressors to deliver air and fuel under high pressure to the working cylinder, the compressors being so timed that the air will be delivered to the working cylinder previous to the end of the compression stroke and the fuel will be delivered to the working cylinder substantially at the end and just subsequent to the compression stroke and be carried to the working cylinder by a charge of compressed inert gas.

It further consists in utilizing the air compressor to supply air under pressure to the working cylinder at the end of the working stroke to blow out the burnt gases.

It also consists in condensing the water vapor in the burnt gases and then utilizing the cleaned gases to vaporize the fuel and carry it to the fuel compressor to be thereafter conveyed to the working cylinder.

It also consists in spraying water and liquid fuel simultaneously into a passage through which inert gases are passing to a compressor by means of which the gases and the water and fuel vapors are forced into the working cylinder at the beginning of the working stroke.

It also consists in providing an engine as above specified with a plurality of working cylinders and with a single source of mixed water and fuel vapors carried by inert gases to supply the several working cylinders in succession.

It also consists in providing a novel circulating system for the lubricating oil, comprising a float chamber below the crank case and connected thereto, a valve to normally close the connecting opening between the float chamber and crank case, a reservoir above the moving parts of the engine, and pipes connecting the float chamber with the reservoir and the reservoir with the moving parts of the engine.

In the accompanying drawings, Fig. 1 is a side elevation of an engine embodying my present invention. Fig. 2 is a section on the line 2—2 of Fig. 1. Figs. 3 and 4, Figs. 5 and 6, and Figs. 7 and 8 are elevations and bottom plans respectively of the lining for the air compressor, working and fuel compressor cylinders respectively. Fig. 9 is a central vertical section showing the construction of the pistons and ends of the connecting rods. Figs. 10 and 11 are a plan and elevation respectively of a bearing support for the connecting rod end shown in Fig. 9. Fig. 12 is a section on the line 12—12 of Fig. 9.

Similar reference characters refer to like parts throughout the several views.

The present engine is of the same general type as that shown in my Patent No. 1,250,950 dated December 25, 1917, and consists of one or more working cylinders, each provided with a separate crank-case, air compressor and fuel compressor, but all connecting to a single crank shaft and single source of fuel supply. I again prefer to connect the air compressor and fuel compressor to the connecting rod of the working cylinder and I prefer to time the operations of the two compressors by the angles between the central lines of the three cylinders. As in the engine of said patent, the explosive charge will be ignited by reason of the high compression within the working cylinder.

The frame or cylinder block 1 of this engine is preferably integral and the various cylinders are preferably provided with linings such as shown in Figs. 3 to 8 inclusive. The lower portion 2 of the crank case is secured to the cylinder block by screws 3 and between them the bearings 4 and 5 of the crank shaft 6 are mounted. This shaft has a crank 7 for each working cylinder and the crank shaft is provided with well known oil passages for the main bearings 4 and 5 and the bearings 8 of the connecting rods 9.

The pistons.

The connecting rod of each working cylinder has a butt 10 provided with pins 11 and 12, and a strap 13. To these pins are attached the connecting rods 14 and 15 of the air and fuel compressors. At the outer end of the connecting rods and uniting them to the pistons 17, 18 and 19 respectively are balls 20 such as shown in Fig. 9 in order to provide large bearing surfaces. The piston has a skirting 22 and head 23. A substantially hemi-spherical bearing cap 24 is secured in position by means of a stem 25 and nut 26 and into this cap is screwed a sleeve 27 having a circumferential lip 28 that supports two semi-circular bearing members 29 that engage the ball. The opening in this sleeve 27 is sufficiently large to permit it to slip down over the ball, after which the members 29 are positioned. The sleeve is then screwed up into the cap after which a locking rod 30 is sprung into holes in the cap and sleeve as shown in Fig. 12. The sleeve 27 is then slipped up into the piston and the nut 26 screwed down to lock the parts together.

The air compressor.

The piston 17 (Fig. 2) uncovers the air admission ports 32 in the lining 33 at both ends of its stroke and these ports admit air which passes down through the sleeve 34 around the fins 35 on the body 36 of the discharge valve, through an opening not shown between the several compressors to the passage 37 and into the compressor. It flows over the fins or ribs 38 on the sleeve 33 and serves to cool this sleeve. On the inward stroke this air is compressed in the crank case while at the outward stroke air is highly compressed within the sleeve 33 and passes up through the passage 39 and pipe 40 to the outer end of the working cylinder. The discharge valve is similar to that used in connection with the fuel compressor.

The fuel compressor.

The piston 19 uncovers the ports 42 in the sleeve 43 at the end of the inward stroke and fuel rushes into the compressor cylinder from the manifold 41. On the outward stroke of the piston the fuel is compressed and forced up through the passage 44, lifting the valve 45 which is held down by the spring 46, and out through the small passages 47 and through the pipe 48 to the top of the working cylinder, the tension of the spring being regulated by the screw 49 mounted in the plug 50 in the upper end of the shell or body 36 of the valve. It will be noticed that the passages 39 and 44 connect to substantially the lowest portions of the uncovered surfaces of the heads 51 and 52 of the air and fuel compressors respectively. Any liquids which accumulate over the pistons collect at the low edges of the pistons and are blown up into the passages 39 and 44 as the pistons approach the outer ends of their strokes by the air or gases being compressed and thus all knocking is avoided.

The working cylinder.

The piston 18 is slidable in a sleeve 53 provided with a port 54 which is uncovered at the end of the working stroke to permit the escape of the burnt gases and the admission of compressed air to scavenge the working cylinder. The burnt gases will flow out through this port 54, through the passage 55, around the sleeve 43 and its ribs 56, giving off much of the heat to this sleeve so that it can be transmitted to the fuel being compressed. The burnt gases then pass through the passage 58 and pipe 59 to the radiator where the water vapors in the gases will be condensed. The passages 55 and 58 are common to the several working cylinders of the engine.

It will be noticed that the air compressor is about forty-five degrees ahead of the working cylinder and the fuel compressor is about thirty degrees behind. The angle or timing of the air compressor may be varied so long as the air being forced into the outer end of the working cylinder begins to enter after the piston 18 has closed the port 54 and the port 60 just opposite, and so long as the ports 62 in the air compressor (which connect to the port 60 by means of a passage 63) are not opened until after the port 54 has been fully opened and the pressure of the burnt gases has been fully relieved. It will be noticed that the air enters the crank case through the ports 32 and will be compressed therein by the inward movements of all the pistons. The piston 17 is in advance of the working piston 18 and will open the ports 62 just after the time the piston 18 has opened the ports 60 and 54. The air compressed in the crank case now rushes through the pipe 63 into the working cylinder, and because of its volume scavenges the working cylinder and leaves the cylinder full of clean air.

The timing of the fuel compressor may be varied so long as all the fuel is forced into the outer end of the working cylinder before the piston therein has moved inwardly an appreciable distance which in practice is before the crank has turned about thirty degrees from dead center, the injection of the fuel preferably beginning just before the piston 18 reaches the outer end of its stroke. This beginning of the flow will largely be regulated by the stiffness of the spring 46.

The radiator.

The radiator 65 (Fig. 1) may be of any desired type with proper passages (not shown) through which air may be drawn by means of the fan 66 driven by the belt 67 on the pulley 68 and on the pulley 69 on the crank shaft 6. A thermostat 70 controls gates or vanes (not shown) in the usual manner and thus the passage of air through the radiator is regulated by the temperature of the burnt gases as they pass out of the radiator through the pipe 72. Water vapors resulting from the combustion of the fuel and which were introduced with the fuel are condensed in the radiator and collect in the tank 73 at the bottom, overflowing through the pipe 74. Water is drawn from the radiator by means of any desired type of pump 75 through the pipe 76 and forced through the pipe 77 to the water jacket 78 of the fuel compressor (Fig. 1), and through the passage 79 to the water jacket of the working cylinder and thence to the radiator through the pipe 81.

The fuel system.

The burnt gases leave the radiator through the pipe 72 and enter the space 84 around the lining 53 of the working cylinder where a portion of the heat of the explosions is given to these gases. The gases then pass to the header 87 connecting the several cylinders and by means of the pipe 88 to the muffler 89.

A portion, however, of the gases pass through the connection of pipe 91 to the manifold 41 (Fig. 1) flowing over the fuel nozzle 92 and over the water nozzle 93. A fuel tank 94 connects to the bottom of a float chamber 95 and a needle valve 96 controls the flow of the fuel to the nozzle 92. A pipe 97 connects to the water jacket of the engine (which is continuous for the several cylinders) and to the float chamber 98, and a needle valve 99 controls the flow of water from the float chamber 98 into the pipe 91. A small lever 100 pivoted at 101 (Fig. 2) has two arms 103 (Fig. 1) that extend under the washers 104 on the stems of the needle valves and any desired means may be employed to operate this lever. The needle valves constitute the control mechanism of the engine. If desired, a butterfly valve may be mounted in the pipe 91 to be operated by the lever 105 shown in Fig. 2.

The oiling system.

As stated before, the crank shaft is provided with the oil passages commonly employed in forced lubrication systems. A reservoir 107 is mounted in any convenient position and oil flows therefrom through the pipe 108 to the crank shaft. The oil from the bearings drips to the bottom of the crank case which has an opening 109 normally closed by means of the valve 110 connected to the float 111, and guided by the downwardly extending flange 113. There is one of these float chambers 115 for each crank case and the valve is depressed only where there is sufficient pressure within the crank case. The oil is forced up to the reservoir 107 through the pipe 114 of which there is one for each crank case. Any desired means to move the oil may be connected between the pipes 108 and 108ª.

It will be seen that by reason of the pistons moving together inwardly and outwardly much of the time, the amount of air drawn into the crank case is quite large and the amount available to scavenge the working cylinder is ample at all times. The mixing of inert gases with the fuel vapor prevents premature explosions in the fuel compressor and in the passages leading therefrom to the working cylinder, and the use of water vapor not only produces more perfect combustion of the fuel but it also serves to render the effect of the combustion of the fuel more sustained.

The details and proportions of the various parts of this engine may all be changed without departing from the spirit of my invention set forth in the following claims.

What I claim is:

1. In an internal combustion engine, the combination of a working cylinder, and means for forcing inert gases carrying the fuel into said cylinder and independent means for forcing air into the working cylinder just before the piston reaches the end of its compression stroke.

2. In an internal combustion engine, the combination of a working cylinder and a piston therein, means for forcing air into said working cylinder before the piston in the working cylinder has completed its compression stroke, means for mixing inert gases and fuel, and means for forcing the fixed fuel and inert gas into the working cylinder immediately after the piston therein has completed its compression stroke.

3. In an internal combustion engine, the combination of a working cylinder and a piston therein, means for forcing air into said working cylinder, means for mixing inert gases and fuel, and means for forcing the mixed fuel and inert gas into the working cylinder after the piston has completed its compression stroke.

4. In an internal combustion engine, the combination of a working cylinder, a piston therein, means for forcing air into said working cylinder just before the piston reaches the end of its compression stroke, a passage for inert gases, means for feeding fuel into said passage, means for feeding water into said passage, and means for drawing the mixed gas, fuel and water from said passage and forcing the mixture into the working cylinder.

5. In an internal combustion engine, the combination of a working cylinder and a piston therein, a crank shaft and a rod connecting the piston to said crank shaft, an air compressor cylinder and a piston therein connected to the crank shaft to force compressed air into the working cylinder, means for mixing inert gases and fuel, a fuel compressor cylinder and piston therein to force the mixed gas and fuel into said working cylinder, and means connecting the fuel compressor piston to said crank shaft.

6. In an internal combustion engine, the combination of a crank case, a crank shaft therein, a working cylinder mounted on the crank case, a piston therein, a connecting rod between the piston and crank shaft, an air compressor cylinder mounted on said crank case, a piston therein, a rod connecting said second piston to the crank end of the first named connecting rod, the angular position of the air compressor being such that air will be forced into the working cylinder just before its piston completes the compression stroke, means to separate the inert gases of the exhaust from the water vapors, a third cylinder mounted on the crank case, a piston therein and means connecting it to the connecting rod of the working cylinder, a passage for conveying inert gases to the third cylinder, means for feeding liquid fuel and water into said passage, and a passage to convey the mixed inert gas, fuel and water from the third cylinder to the working cylinder.

7. In an internal combustion engine, the combination of a working cylinder, a piston therein, means to separate the inert gases of the exhaust of said engine from the water vapors, a second cylinder adjacent the working cylinder, a piston therein, and means for driving said piston from the piston of the working cylinder, a passage for conveying inert gases to said second cylinder, adjustable means for injecting liquid fuel into said passage, and means to convey the compressed gases and fuel to the working cylinder.

8. In an internal combustion engine, the combination of a working cylinder and a piston therein, means for forcing air into said working cylinder before the piston in the working cylinder has completed its compression stroke, means for mixing inert gases and fuel, and means for forcing the mixed fuel and inert gas into the working cylinder immediately after the piston therein has completed its compression stroke.

9. In an internal combustion engine, the combination of a working cylinder, a piston therein, means to separate the inert gases of the exhaust of said engine from the water vapors, a second cylinder adjacent the working cylinder, a piston therein and means for driving said piston from the piston of the working cylinder, a passage for conveying inert gases to said second cylinder, adjustable means for injecting liquid fuel into said passage, adjustable means for injecting water into said passage, and a passage to convey the compressed gas, fuel and water to said working cylinder.

10. In an internal combustion engine, the combination of a working cylinder, a piston therein, means to separate the inert gases of the exhaust of said engine from the water vapors, a second cylinder adjacent the working cylinder, a piston therein and means for driving said piston from the piston of the working cylinder, a passage for conveying inert gases to said second cylinder, adjustable means for injecting liquid fuel into said passage, adjustable means for injecting water into said passage, and a passage to convey the compressed gas, fuel and water to said working cylinder, a third cylinder adjacent the working cylinder, a piston therein, means for driving the third piston from the piston of the working cylinder, and means for conveying compressed air from the third cylinder to the working cylinder.

MELL ALLISON BOLTON.